Jan. 21, 1969    J. K. HAWKSHAW    3,423,053
WATER BOMBING SYSTEM FOR HYDROPLANES

Filed Aug. 4, 1967    Sheet 1 of 7

FIG 1

INVENTOR
JOHN K. HAWKSHAW
BY Cavanagh & Norman

INVENTOR
JOHN K. HAWKSHAW

BY Cavanagh & Norman

INVENTOR
JOHN K. HAWKSHAW
BY Cavanagh & Norman

INVENTOR
JOHN K. HAWKSHAW
BY Cavanagh & Norman

United States Patent Office 3,423,053
Patented Jan. 21, 1969

3,423,053
WATER BOMBING SYSTEM FOR HYDROPLANES
John Knox Hawkshaw, 86 Bartley Bull Parkway,
Brampton, Ontario, Canada
Filed Aug. 4, 1967, Ser. No. 658,381
U.S. Cl. 244—136                                  9 Claims
Int. Cl. B64d *1/16;* E05f *15/00;* G09f *9/00*

ABSTRACT OF THE DISCLOSURE

This specification discloses a hydroplane that is equipped for water bombing with the equipment comprising: a water tank built into each pontoon with each tank having a discharge opening at the bottom and, a hingedly mounted door normally closing said opening and held in closed position by a latch. A retractable scoop is mounted on the tank bottom at one side of said door and associated therewith is a filler tube. Mechanism is provided for releasing the latch to open the door and for closing the door. Operating means are provided for raising and lowering the scoop and this means includes a float switch for automatically raising the scoop when the water reaches a predetermined level in the tank. Controls for operating the various mechanisms are located in the cockpit and signals are provided to advise the pilot of the conditions obtaining in the bombing equipment. The mechanisms aforesaid are operated either electrically or hydraulically and manually operable emergency devices are provided to release the door or close it upon failure of such equipment.

---

The present invention relates to aircraft of the hydroplane type and is concerned primarily with the equipment of such a plane which adapts it to use in water bombing. Forest fires often occur in areas where lakes are close by and readily accessible. This invention is founded on the recognition that the water from such lakes is handy for fire extinguishing purposes and aircraft of the hydroplane type, which are commonly used in such localities constitute a convenient device for delivering the water to a fire.

An aircraft of the type with which this invention is concerned ordinarily includes a fuselage or body and a pair of floats or pontoons supporting the body with the body including a cockpit where the controls for the aircraft are located. An important object of the present invention is to provide water bombing equipment, the controls for which are located in the cockpit where they are conveniently accessible to the pilot.

Each of the floa:s aforesaid includes a tank having a downward opening normally closed by a hingedly mounted door. This door is held in closed position by a latch, which, when released permits the door to open quickly under gravity action and the weight of the water in the tank. Opening movement of the door is limited and this provides for a concentrated pattern in the dumped water which is highly desirable in fire extinguishing.

An object of the invention is to provide electrical means for releasing the latch with the control therefor disposed in the cockpit. Another object is to provide a hydraulic device for closing the door with the control therefor located in the cockpit. Highly important objects are to provide manually operable mechanisms for releasing the latch and closing the door which are available for emergency use, with the operating elements thereof being arranged in the cockpit and accessible to the pilot.

With a door closed the tank is filled to a desired level by lowering a probe or scoop below the float bottom. A filler tube extends up into the tank from the scoop to an open end spaced from the tank top. It is evident that with the float moving over water, and the scoop immersed therein, movement of the plane causes the scoop to pick up water and convey it through the tube to the tank interior.

It is axiomatic in the flying of aircraft that a safe load limit should not be exceeded. In an aircraft of the type with which this invention is concerned the variable load factors are the fuel and water. With the fuel tank full the water tank should take on only a minimum of water. On the other hand with the fuel tanks low the water tanks may carry more water. Moreover, for any given condition the predetermined level in the water tanks should not be exceeded.

With these conditions in mind the invention has in view, as another highly important object the provision of a float switch which is positioned in a water tank and which is automatically operable when the water in the tank reaches a predetermined level to raise the scoop for that tank. The effective height of such float switch in its tank may be adjusted from a cockpit control.

Another highly important object is to provide, in an aircraft of the type noted, water bombing equipment, which, when installed, but not in use, does not interfere with or impair the normal use of the aircraft.

Various other more detailed objects and advantages of the invention such as those which arise in connection with the operating mechanisms, control devices and indicators, will, in part become apparent and in part be hereinafter stated as the description of the invention proceeds.

For a full and more complete understanding of the invention reference may be had to the following description and accompanying drawings wherein.

*General organization*

Figure 1:
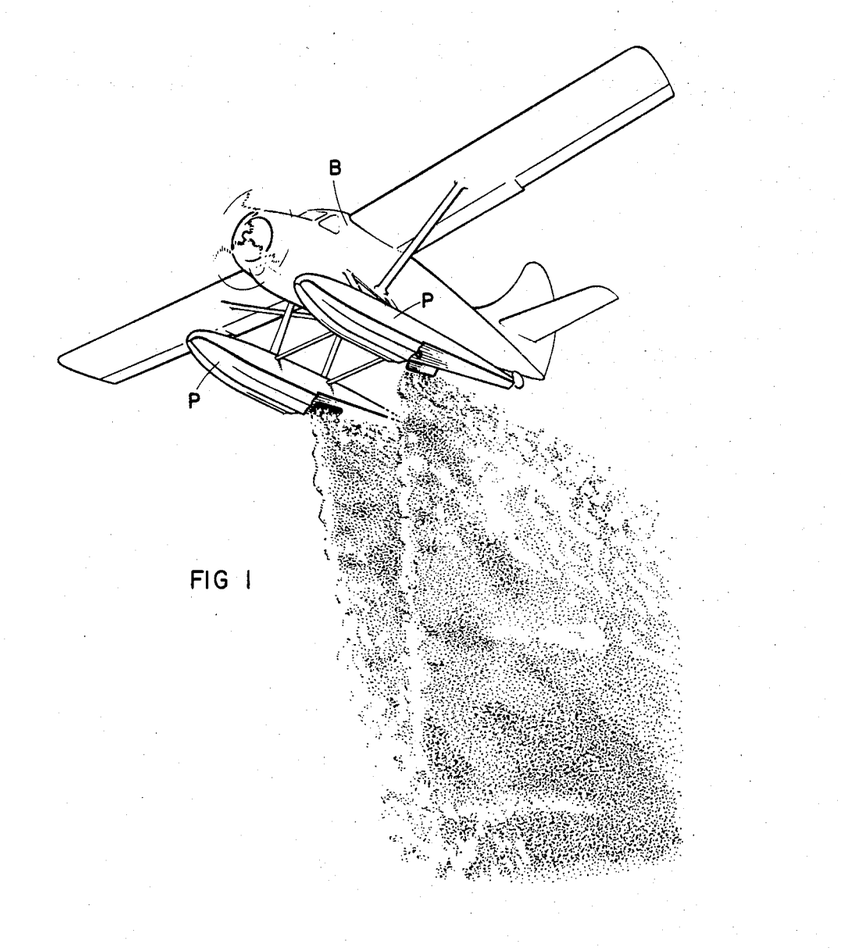
FIGURE 1 is a perspective of a hydroplane equipped for water bombing in accordance with the precepts of this invention, and illustrates water as it is being dumped.
Figure 2:
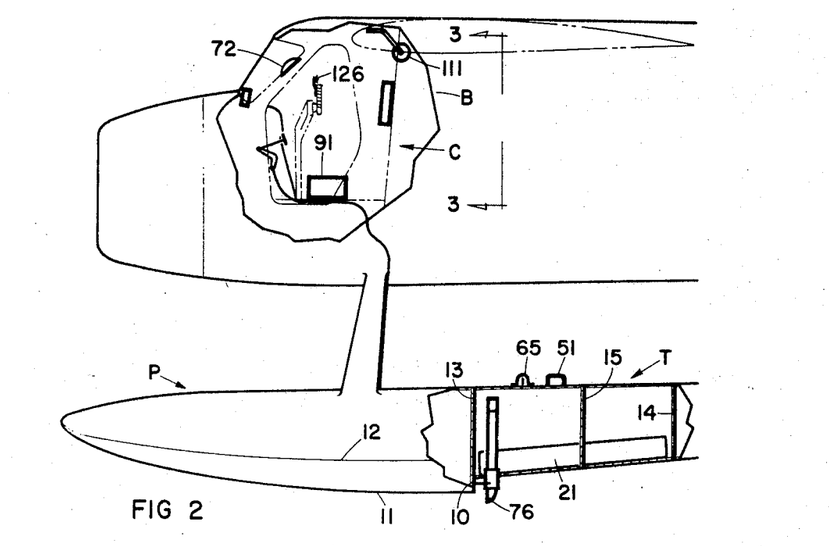
FIGURE 2 is a view in side elevation of the forward end of the aircraft with parts of the body broken away and the controls which are pertinent to this invention depicted somewhat diagrammatically.
Figure 3:
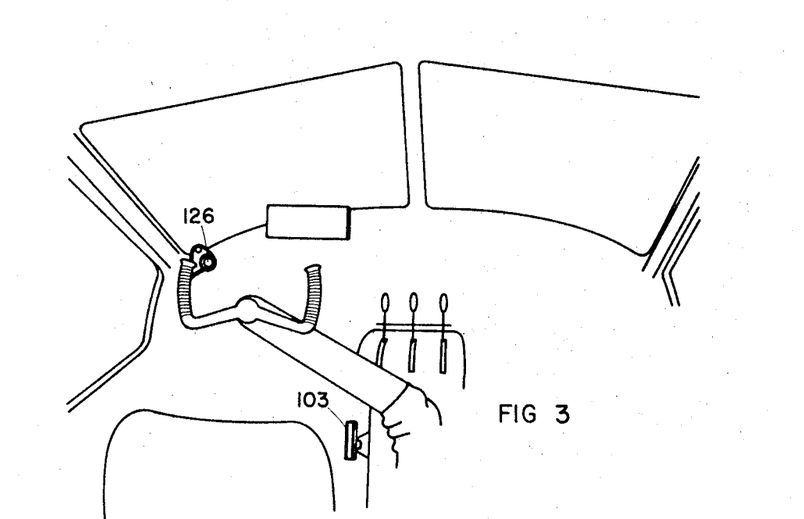
FIGURE 3 is a schematic illustration of the cockpit looking in a direction from the rear and normal to FIGURE 2.

An aircraft of the hydroplane type is shown in FIGURE 1 as including a fuselage or body B and a pair of pontoons P. Referring now more particularly to FIGURE 2, the forward end of the body B is shown as enclosing a cockpit C. In accordance with conventional practice the controls for the aircraft are located in the cockpit C and in accordance with the present invention the controls for the water bombing equipment are similarly located.

Each pontoon P has a bottom which is stepped intermediate of the ends thereof with the shoulder constituting the step being shown at 10. The pontoon bottom presents a keel 11 and inboard and outboard chines 12.

Built into each pontoon P is a tank which is referred to in its entirety by the reference character T. Each tank T includes a forward bulkhead 13, an aft bulkhead 14 and an intermediate bulkhead 15. The bulkhead 15 is provided with openings 16 (see FIGURE 5) to permit water to flow between the two sections of the tank defined by the central bulkhead.

The bulkheads 13 and 14 have openings in which are fitted bearings 17 and a main shaft 18 is journaled in these bearings. Between the keel 11 and inboard chine 12 and mounted in the tank bottom is a door frame 19 presenting an opening 20 that opens downwardly and is adapted to be closed by a door 21. The frame 19 includes an inner side bar 22 which is arranged adjacent to the keel 11. The door 21 is hingedly mounted on this frame bar 22 by the hinges shown at 23.

*Door operating mechanism*

Mounted on the upper or inner face of the door 21 are a pair of bars 24 the inner ends of which may form a part of the hinges 23. Pivotally connected to the end of each bar remote from the hinge 23 as indicated at 25 is a link 26. The other end of each link 26 is pivotally connected as indicated at 27 to an arm 28 which radially outstands from a sleeve 29 that is in driving relation to the shaft 18. This driving relation may be established in any preferred manner such as by keying.

Figure 4:
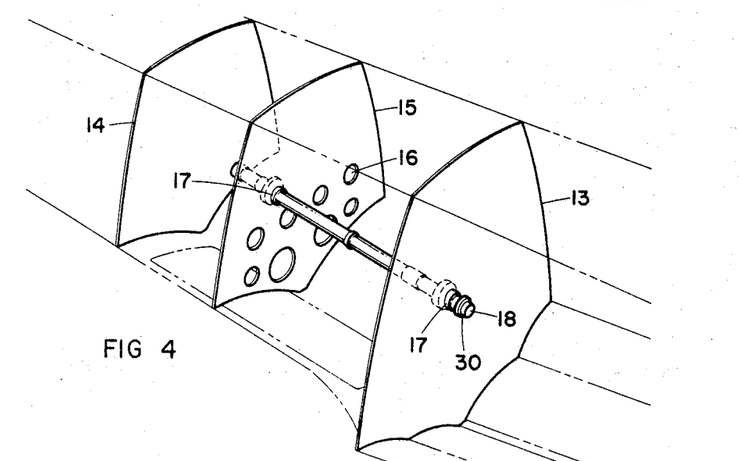
FIGURE 4 is a detailed perspective of a portion of one pontoon with parts broken away to illustrate the bulkheads and main operating shaft which is journaled therein.

Shaft 18 projects beyond the front face of the bulkhead 13 (FIGURE 4) with the projecting portion being designated 30. Driveably mounted on this portion 30 of the shaft and adjacent to the face of the bulkhead 13 is a bell crank member identified in its entirety by the reference character M. The member M presents a long arm 31 and a short arm 32. The arm 31 is formed with a notch or recess 33 at its free end, while the arm 32 carries at its free end a tab or flange 34 which is directed inwardly towards the bulkhead face. The arm 31 carries at one edge and at a point intermediate its ends an abutment flange 35 which is directed outwardly away from the bulkhead face.

Fixedly secured to the outer face of the bulkhead 13 is a bracket 36. A latch arm 37 is pivotally mounted as indicated at 38 on the bracket 36. Extending outwardly from one side of the latch arm 37 is a pin 39 which is adapted to be received in the recess 33 when the door is latched. A solenoid 40 (shown diagrammatically in FIGURES 7 to 11 inclusive) is mounted on the outer face of the bulkhead 13 and the armature (not illustrated) of the solenoid is connected by a cable 41 to the latch bar 37.

Mounted on the outer face of the bulkhead 13 is bracket 42 and one end of a hydraulic cylinder 43 is mounted on the bracket 42 with the pivotal connection being shown at 44. Operatively included in the cylinder 43 is a piston 45 the outer end of which is pivotally connected as indicated at 46 to a link 47 the outer end of which is formed with a bearing 48 which rotatably receives the shaft 18. It is notable that the end of the piston 45 is adapted to engage the flange 34 on the arm 32 of the bell crank to rotate the shaft with a door closing movement.

Figure 7:
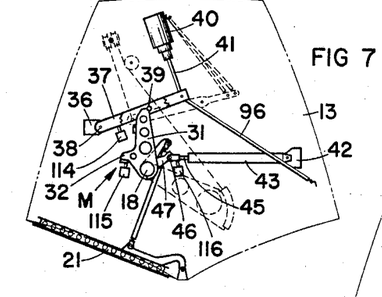
FIGURE 7 is an elevation largely diagrammatic taken on a plane normal to the main shaft showing the condition of the door operating mechanism and a latch when the door is closed.

Briefly summing up at this point, the operation of the mechanism which operates the door under normal conditions will be described. The conditions which obtain when the door is closed and latched is shown in FIGURE 7. Thus the pin 39 is received in the recess 33 to hold the shaft 18 against rotation. Moreover, the piston 45 of the hydraulic cylinder is retracted and its end out of engagement with the flange 34.

Figure 8:
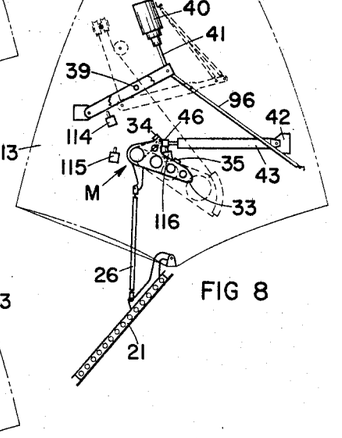
FIGURE 8 is a view similar to FIGURE 7 with the door open.
Figure 9:
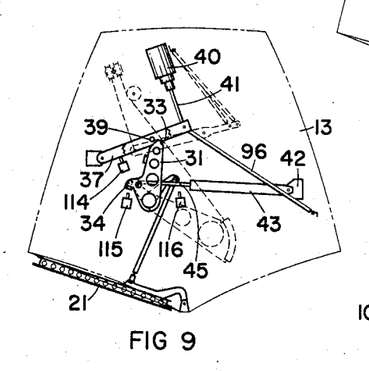
FIGURE 9 is another view showing the door approaching fully closed position and the corresponding condition of the door operating mechanism.

Upon energizing the solenoid 40 the latch arm 37 is raised to remove the pin 39 from recess 33. Thus the door falls open under gravity action and the shaft 18 rotates in a clockwise direction (speaking with reference to the showing of FIGURES 7 to 11 inclusive). The open position of the door and associated instrumentalities is illustrated in FIGURE 8. In this position the door is at an angle with respect to the vertical. This is caused by each set of links 26 and arms 28 assuming an aligned condition. When so aligned the door cannot open further. It is notable that the flange 34 now engages the end of piston 45. Thus, when fluid under pressure is delivered to the hydraulic cylinder 43 the piston is driven outwardly and due to the engagement of the piston and with flange 34 the bell crank M and shaft 18 are rotated in a counter-clockwise direction. Thus the door is moved to closed position. FIGURE 9 depicts the relation of bell crank arm 31 and recess 33 with respect to the pin 39 just before the door reaches the finally closed position.

*Door operated devices*

A pressure relief vent and overflow is provided. Upon referring to FIGURE 15 the tank top which is shown at 49 is formed with a vent 50. A closure 51 is pivotally mounted on the tank top at one side of the opening 50 by the hinge indicated at 52. Extending downwardly from the closure 51 is an ear 53 to which is pivotally connected, as indicated at 54, a rod 55. The lower free end of the rod 55 is formed with an abutment flange 56, and spaced therefrom is another flange 57. That portion of the rod 55 between flanges 56 and 57 is received in a tube 58 the free end of which is formed with an inturned lip 59. An expansion coil spring 60 is interposed between end flange 56 and lip 59.

Figure 5:
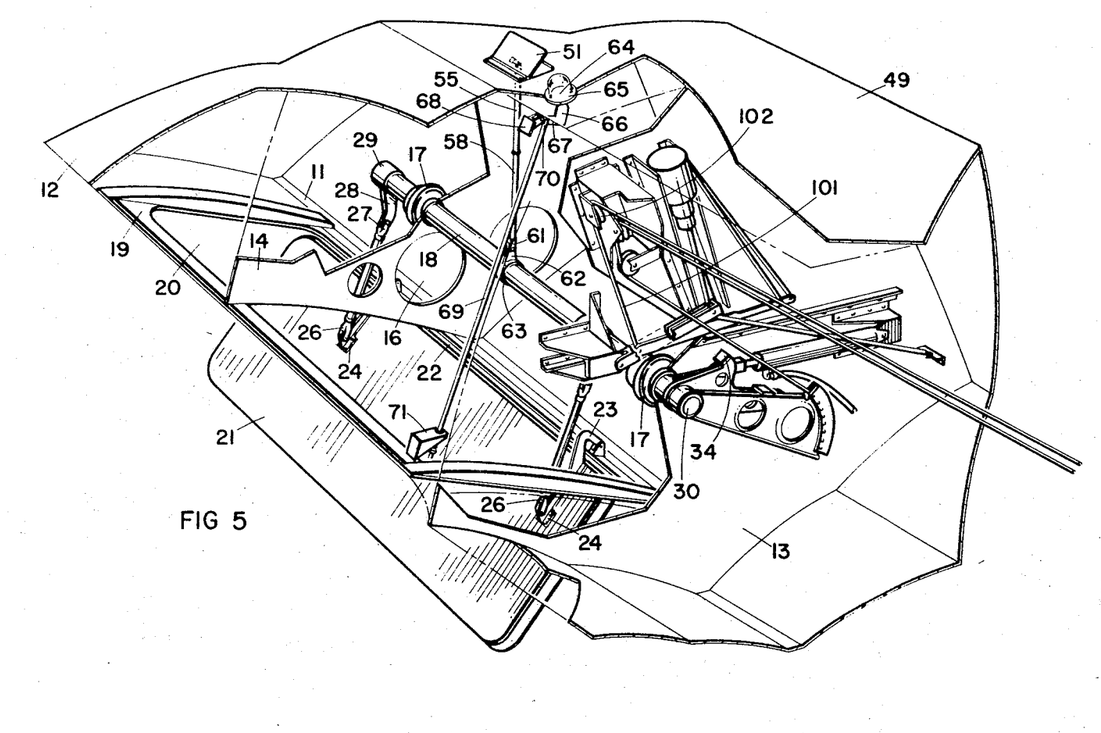
FIGURE 5 is another detailed perspective showing the door, main shaft, connections between the two, and the mechanism for rotating and controlling the rotation of said shaft.

Upon referring to FIGURE 5 it will be seen that the lower end of the tube 58 is pivotally connected by a loop member 61 to an arm 62 which outstands from a collar 63 that is driveably mounted on shaft 18. Thus as the shaft 18 is rotated in a door closing direction the closure 51 is also moved into vent closing position. Further the spring loaded arrangement between rod 55 and tube 58 permits the closure to open as under the influence of pressure from the interior of the tank.

Figures 12, 15:
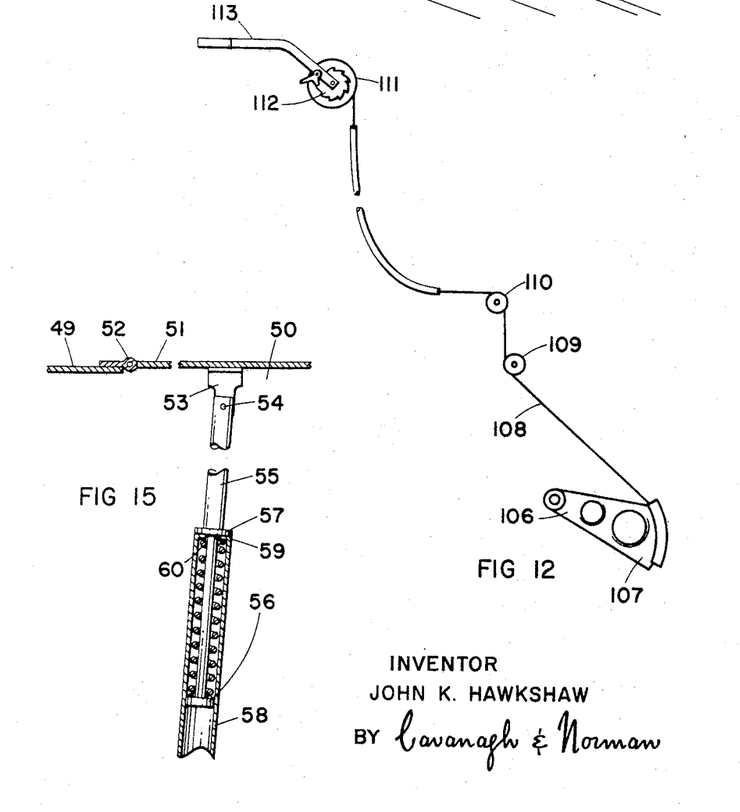
FIGURE 12 is a detailed side view somewhat diagrammatic of the winch and cable constituting the emergency door closing mechanism.
FIGURE 15 is a detail of the vent closure and spring loaded rod for operating the same.

The tank top 49 is formed with an opening 64 in front of the vent 50. Mounted on the top about this opening is a dome-like member 65 of transparent material. An indicator 66 is carried by an arm 67 which is pivotally mounted as shown at 68 on the tank top. A push rod 69 has its upper end pivotally connected to the arm 67 as shown at 70 and its lower end is slideably received in a bracket 71 carried by the door frame 19. The rod 69 has a free end projecting below the underside of the door frame which is adapted to be engaged by the door just before it reaches its finally closed position. Thus with the door open or partially open gravity action will cause the indicator 60 to fall down where it is hidden from the view of the pilot by the medium of the mirror 72. It is only when the door 21 engages the lower end of the rod 69 during the last half-inch of closing movement that the indicator flange 66 is moved up into a position in which it may be seen by the pilot through the mirror.

The scoop

Figure 6:
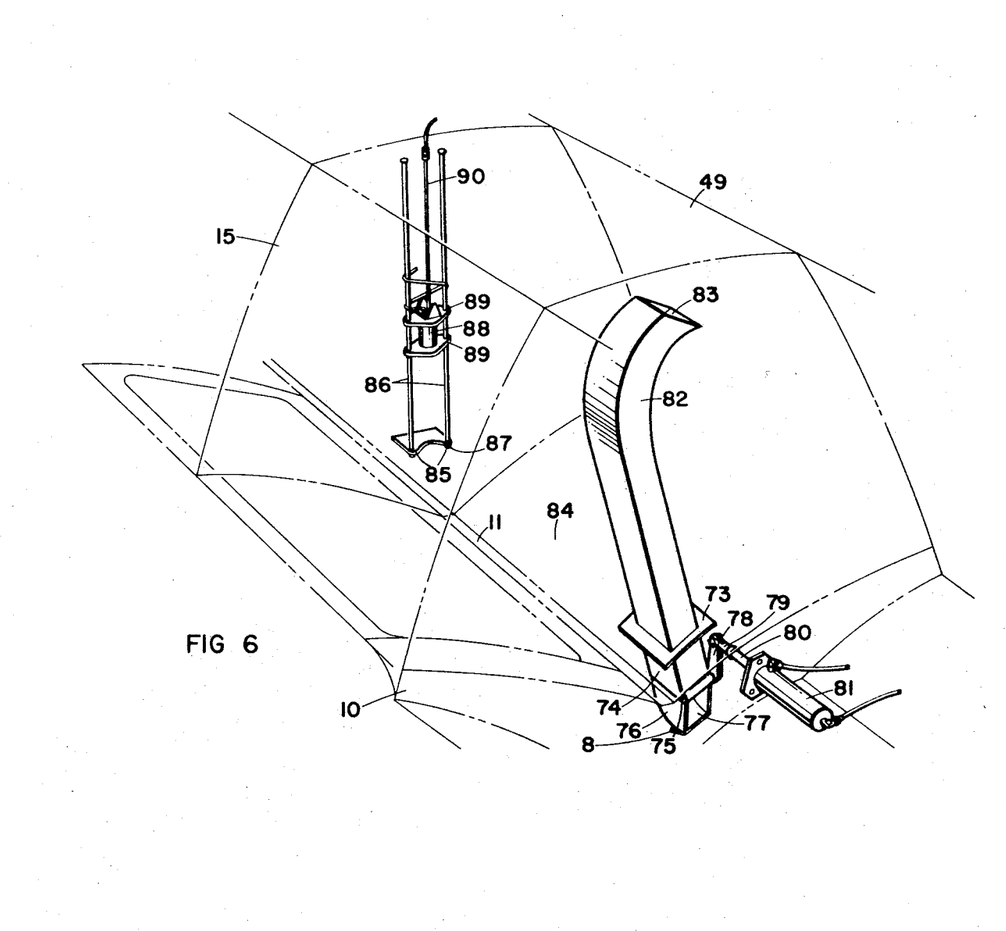
FIGURE 6 is a perspective of a portion of one tank depicting the float switch, scoop, and associated devices.

Referring now more particularly to FIGURE 6, a rectangularly shaped plate-like bracket 73 is secured to the pontoon bottom outwardly of the keel and just in front of the shoulder 10. A rectangularly shaped tube 74 depends from the underside of the plate 73 and pivotally mounted in the open end thereof by a shaft 75 is a probe or scoop 76 in the nature of a claim shell with parallel side walls and which scoop when in its lowered position presents an opening at 77 for picking up water as an incident to forward movement of the aircraft over a body of water.

The only part of the scoop which projects below the shoulder 10 of the pontoon bottom is its open mouth. Extending rearwardly from this mouth is a flange 8 of a predetermined extent. With the scoop open the flange 8 assumes a direction substantially in alignment with movement of the aircraft. Thus there is a clean breakaway at the trailing edge of the flange 8. Thus breakaway is not only present in the structure of the scoop but also occurs between the flange edge and the water. Thus turbulence is avoided and the efficiency of water pick-up action improved with a minimum of resistance to aircraft movement.

The scoop 76 is in driving relation to the shaft 77 and also carried by the shaft 77 in driving relation thereto is an arm 78 to the outer end of which is pivotally connected as by yoke 79 to piston 80 of hydraulic cylinder 81. The cylinder 81 is mounted on the pontoon bottom.

Extending upwardly from the plate 73 and into the tank is a filler tube 82, the upper end portion of which is curved and terminates in an open end 83 spaced from the tank top. It is evident that even with the scoop 76 down in open position and water in the tank, such water cannot escape because of the upper disposition of the open end 83.

Formed in a bracket carried by the central bulkhead 15 are a pair of apertures 85. A pair of guide rods 86 have their lower ends formed with threaded sockets which receive headed screws 87 to anchor the lower ends of the guide rods to the tank bottom. The upper ends of these guide rods 86 are anchored in the same manner to the tank top 49.

A float housing comprises a tube 88 which is open ended and mounted on a pair of spaced plates 89 which are slideably carried by the guide rods 86 and arens cable 90 is connected to the float housing at the top plate 89 and extends up into the cockpit C with its end secured to an operating member represented at 91 (FIGURE 2). Thus it is evident the position of the float housing may be adjusted by the pilot. The opening at the lower end of tube 88 is restricted to limit the rate of flow of water thereinto.

Figure 13:
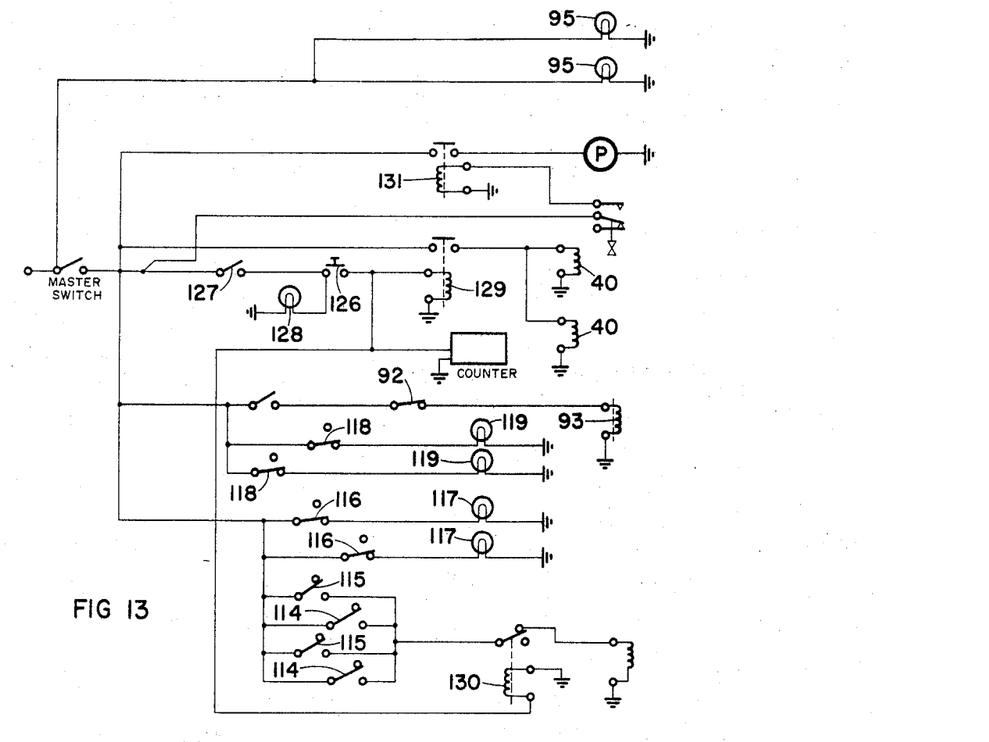
FIGURE 13 is a wiring diagram depicting the relation between the various electric elements.

Positioned in tube 88 is a float (not illustrated) which is operatively connected to a switch represented diagrammatically at 92 in FIGURE 13. This switch 92 is connected to a solenoid 93 which operates a selector valve 94 which controls the delivery of the hydraulic medium to the cylinders 81.

It is evident that with the float housing adjusted to a desired level, when water in the tank reaches that level the float will actuate the swtich to energize the solenoid 93 to operate the valve 94 to deliver the hydraulic medium to cylinders 81 to raise the scoops and discontinue the picking up of water. As the opening in the tube 88 is restricted the float will operate when the water is slightly higher, say two inches, than the float. This eliminates surging of water in the tank.

Emergency devices

Should either of the doors fail to dump the failure will be indicated on a control panel in the cockpit, particularly by failure of the lights at 95 to go out. A manually operable mechanical device is provided for each latch and this device is operable by the pilot from the cockpit.

Each latch arm 37 is normally biased to its latched position, that is with the pin 39 engaged in the recess 33 by an elastic tension member such as a shock cord 96, one end of which is secured to the free end of the latch and the other end to the tank structure as indicated at 97. The latch arm 37 carries another pin 98 which projects therefrom on the side opposite the pin 39.

An auxiliary latch arm 99 is pivotably mounted at 100 on the outer face of the bulkhead 13. At one end of this auxiliary arm 99 a cable 101 is secured. The cable 101 passes over a pulley 102 and then to an emergency dump handle 103 in the cockpit. A tension element 104 such as a shock cable has one end secured to the other end of the arm 99 with the cable end anchored to the bulkhead.

Figure 10:
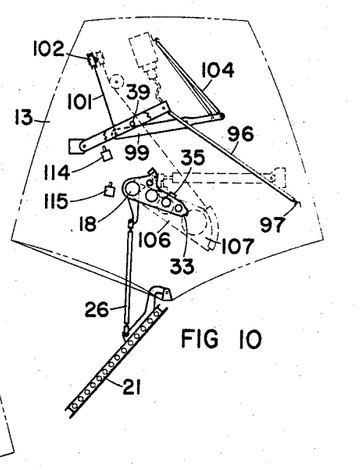
FIGURE 10 is still another view similar to FIGURE 7 illustrating the door as opened by the emergency latch releasing mechanism.

Under normal conditions the cable 101 and the tension element 104 maintain the auxiliary arm 99 in a position in which it does not affect or is not affected by normal operation. However, under emergency conditions the pilot may avail of the handle 103 to execute a pull on the cable 101. This raises the arm 99, and, as this arm is located beneath the pin 98 the latter is engaged to raise the latch arm 37 and disengage the pin 39 from the recess 33. Thus the latch is released and the door falls open.

Figure 11:
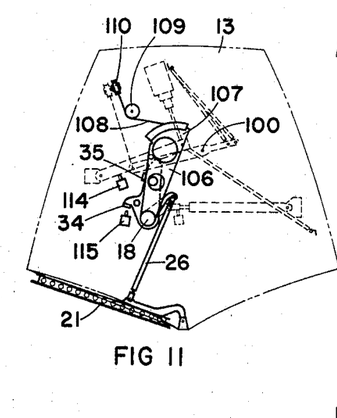
FIGURE 11 is another view similar to FIGURE 7 showing the door as partially closed by the emergency door closing mechanism.

Should the doors fail to close under influence of the hydraulic devices provided for this purpose, emergency door closing mechanism may be utilized. This mechanism is entirely mechanical and manually operable. It comprises an arm 106 that is mounted on the shaft 18 on the inner side of the bell crank M. Ordinarily there is no driving relation between arm 106 and the shaft 18. This arm 106 has an enlarged outer end portion 107 the edge of which is grooved. Received in this groove is a cable 108 with the end of the cable being anchored to the arm. The cable 108 passes over sheaves 109 and 110 to winch 111 located in the cockpit. Operatively included as a part of the winch 111 is a ratchet 112 having an operating member 113. The distance between the teeth of ratchet 112 is related to the amount of movement provided for in push rod 69 to raise the flag 66.

When the door is to be closed manually under emergency conditions the pilot grasps the handle 113 and makes a predetermined number of arcuate movements of the handle. This winds the cable up on the winch to an extent which should close the door. Should the door be not fully closed on the first attempt a repeated effort can be made. In any case the spacing of the ratchet teeth prevents the door from falling back more than the slight distance determined by this spacing. Should the door not fully close it still will be closed sufficient to permit of a safe landing.

Electrical and hydraulic diagram

Figure 14:
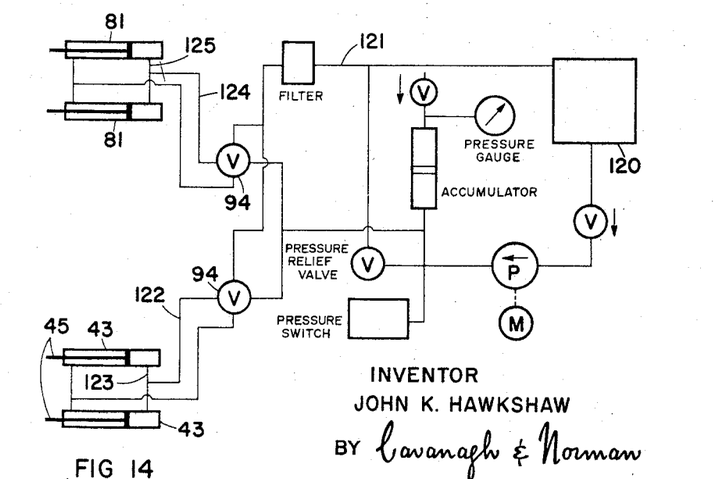
FIGURE 14 is a schematic view of the hydraulic system.

FIGURES 13 and 14 depict diagrammatically the relation between the electric and hydraulic devices and the controls in the cockpit. It is not intended as an engineering layout but merely to illustrate the relation of and cooperation between the various parts of the mechanism.

Associated with each latch arm 37 is a micro switch 114. Operatively arranged relative to each bell crank arm 32 is a "door closed" micro switch 115. These micro switches 115 and 114 are conditioned so that when they are normally open the circuit to each solenoid 40 is open, but the signal light 95 for that door is energized.

Associated with the piston of each door closing hydraulic cylinder 43 is a micro switch 116 which, when normally open, completes a circuit to the indicating light 117 for that cylinder on the panel.

Operatively arranged with respect to the piston 80 of each scoop operating hydraulic cylinder 81 is a micro switch 118 which is connected to a signal light 119 on the panel.

A hydraulic reservoir is represented at 120. The pump and motor therefor are illustrated diagrammatically because such are well-known to electrical engineers. From the reservoir 120 a conduit 121 goes to the selector valves 94. From one side of each of the latter a conduit 122 extends to a head 123 for the door closing cylinders 43. From the other selector valve 94 a conduit 124 extends to a head 125 for the scoop operating cylinders 81.

A dump button is represented at 126. The arming switch for the dump button switch 126 is indicated at 127. Associated therewith is a signal light 128 which goes on when the button is "armed" or ready for operation. The dump button is connected to relay 129 which controls the solenoids 40.

*Operation*

The selector valves 94 are electrically operated by solenoids and are under the control of the pilot. Each valve 94 is a two position four way valve.

In the door closed condition depicted in FIGURE 7 the shaft 18 is mechanically latched and the piston 45 of the door closing cylinder 43 is retracted. The corresponding door closed micro switch 115 is depressed as is the door latched micro switch 114. The piston 45 of the door closing cylinder 43 for that door is also retracted with the micro switch 116 deperessed to its normally open condition. In this condition no electric power is delivered to the solenoid 40 nor any hydraulic power to the cylinder 43. However, the normally open ends of the micro switches 114, 115 and 116 energize the signal lights 95 and 117.

Upon turning the arming switch 127 to "on" position the indicating light 128 is energized and power is fed to one side of the dump button 126.

Upon depressing the dump button 126 the relay 129 and solenoids 40 are energized. This raises the latch arms 37 and removes the pins 39 from the recesses 33 to unlatch the doors 21 permitting them to fall open. As this action takes place each door closed micro switch 115 and door latched micro switch 114 is released to closed position cutting out the signal lights 95 and power is delivered to one side of relay 130. It is notable that as long as the dump button 126 remains closed the relay 130 is open and prevents current delivery to the selector relay 93.

Upon release of the dump button 126 relay 130 closes and the four micro switches 114 and 115 energize the solenoid 93 of one hydraulic selector valve 94. Hydraulic medium under pressure is then delivered to the cylinders 43 to extend the pistons 45, which, by engagement with the flanges 34 rotate the bell cranks M with a door closing movement. As this action takes place the micro switches 116 are released to extinguish lights 117.

The jacks continue to extend until each of the door closed micro switches 115 and door latch micro switches 114 are depressed which interrupts the delivery of power to the hydraulic selector valve 94. The pistons 45 of the cylinders 43 are retracted and the normally open ends of these switches again energize the lights 95. As the pistons 45 are completely retracted the micro switches 116 are again depressed to energize the lights 117.

It is notable that the normally open ends of the door closed and door latched micro switches 114 and 115 are in series for each door but in parallel with themselves for the other door. This is a well-known electrical arrangement and means that the door closed and latched light 95 is independent of the corresponding light for the other pontoon.

It is further noted that the normally closed ends of all four of these switches 114 and 115 are parallel, which means that both doors must be closed and latched before the pistons 45 retract.

The hydraulic cylinders 81 for the scoop 76 are under the control of the solenoid 93 which is connected to a switch 131 on the panel. Thus the switch 131 may be operated to raise or lower the scoop. The scoop also may be raised by the automatically operable float switch 92. The signal lights 119 are connected to the micro switches 118 and indicate the raised position of the scoops. The pilot will be advised of failure to dump when the signal lights 95 remain energized after a depression of the dump button, and also by failure of the flag 66 on the pontoons to dissappear. He will also be further advised by the feel of the aircraft.

If he wishes to make an emergency dump he merely pulls the handle 103 which exerts a pull on the cable 101 to unlatch the door.

If the failure to dump has been caused by failure associated with the dump circuitry or components thereof (solenoids 40, relay 49, dump button 46, etc.) the doors will automatically close as soon as the emergency handle is released. If failure is more general the doors will have to be manually closed by the mechanical device for that purpose. Thus the handle 113 for a winch 111 is operated by the pilot. Purely by way of example for one installation, it is noted that the winch handle 113 may require about eight strokes for the door closing operation. As the doors close after the last half-inch the flags 66 become visible, but the spacing of the ratchet teeth prevents the door being open more than distance determined by this spacing. Upon release of the handle 113 the doors will open this slight distance and will hang on the cables 108. However landing can be safely achieved if the door is open this slight distance. After landing the pressure of the water on the outside of the doors holds them in sealing position.

The purpose of the micro switches for indicating the retracted position of the pistons of the scoop cylinders on the lights 119 is to warn the pilot against further loading in the event a piston had seized at some point on a previous stroke.

It is notable that the solenoid arrangement for the latch arm and the hydraulic mechanism for closing the doors are so designed and related to the emergency devices there is no possibility of hydraulic piston or solenoid seizure interfering with either emergency opening or emergency closing.

The electronic system is such that the door pistons extend only under power. Upon power failure they retract. Likewise the scoop pistons extend to lower the scoops into effective position only under power. Upon withdrawal of power the scoops raise.

What is claimed is:

1. In a hydroplane equipped for water bombing, said hydroplane including a body having a cockpit, and a pair of pontoons supporting said body, each of said pontoons including a built-in tank having a downward opening, a door hingedly mounted at one side of said opening and normally biased to open position by gravity action, bulkheads in said tank, a shaft journalled in said bulkheads, mechanical linkage between said shaft and door whereby rotation of said shaft causes swinging movement of said door, and a latch holding said door in closed position; the improvement consisting of: electrical means operable from said cockpit to release said latch and permit said door to swing open; hydraulic means to rotate said shaft to move said door to closed position and including a control in said cockpit; a manually operable mechanical device for releasing said latch and including an operating member in said cockpit; and a manually operable mechanical device for imparting door closing rotation to said shaft, said last mentioned device including an operating member in said cockpit.

2. In a hydroplane equipped for water bombing, said hydroplane including a body having a cockpit, and a pair of pontoons supporting said body, each of said pontoons including a built in tank having a downward opening, a door hingedly mounted on said tank at one side of said opening, bulkheads included as a part of said tank, a shaft journalled in two of said bulkheads, mechanical linkage between said shaft and door whereby rotation of said shaft causes swinging movement of said door, a latch for holding said shaft in door closed position; a scoop pivotally mounted on said tank and movable into effective position projecting below said pontoon to pick up water as an incident to movement of the hydroplane over water, and a filler tube communicating between said scoop and the interior of said tank; the improvement consisting of: electrical means operable from said cockpit to release said latch and permit said door to swing open; hydraulic means to rotate said shaft to move said door to closed position and including a control in said cockpit; a manually operable mechanical device for releasing said latch and including an operating member in said cockpit; a manually operable mechanical device for imparting door closing rotation in said shaft, said last mentioned device including an operating member in said cockpit; means to swing said scoop into and out of operative position; and float actuated means to operate said scoop moving means to move said scoop into ineffective position when water reaches a predetermined level in said tank.

3. In a hydroplane equipped for water bombing, said hydroplane including a body having a cockpit, and a pair of pontoons supporting said body, each of said pontoons including a built in tank having a downward opening, a door hingedly mounted on said tank at one side of said opening, bulkheads included as a part of said tank, a shaft formulated in two of said bulkheads, mechanical linkage between said shaft and door whereby rotation of said shaft causes swinging movement of said door, a latch for holding said shaft in door closed position; a scoop pivotally mounted on said tank and movable into effective position projecting below said pontoon to pick up water as an incident to movement of the hydroplane over water, and a filler tube communicating between said scoop and the interior of said tank; the improvement consisting of: electrical means operable from said cockpit to release said latch and permit said door to swing open; hydraulic means to rotate said shaft to move said door to closed position and including a control in said cockpit; a manually operable mechanical device for releasing said latch and including an operating member in said cockpit, a manually operable mechanical device for imparting door closing rotation to said shaft, said last mentioned device including an operating member in said cockpit; a hydraulic device for moving said scoop, a solenoid controlling operation of said hydraulic device, and a switch for said solenoid, a float responsive to the level of water in said tank to operate said switch.

4. In a hydroplane equipped for water bombing, said hydroplane including a body having a cockpit, and a pair of pontoons supporting said body, each of said pontoons including a built-in tank having a downward opening, a door hingedly mounted on said tank at one side of said opening, bulkheads included as a part of said tank, a shaft journalled in two of said bulkheads, mechanical linkage between said shaft and door whereby rotation of said shaft causes swinging movement of said door, a latch for holding said shaft in door closed position; a scoop pivotally mounted on said tank and movable into effective position projecting below said pontoon to pick up water as an incident to movement to the hydroplane over water, and a filler tube communicating between said scoop and the interior of said tank; the improvement consisting of: electrical means operable from said cockpit to release said latch and permit said door to swing open; hydraulic means to rotate said shaft to move said door to closed position and including a control in said cockpit; a manually operable mechanical device for releasing said latch and including an operating member in said cockpit, a manually operable mechanical device for imparting door closing rotation to said shaft, said last mentioned device including an operating member in said cockpit; a hydraulic device for moving said scoop, a solenoid controlling operation of said hydraulic device, a switch for said solenoid, a float responsive to the level of water in said tank to operate said switch, said float being vertically adjustable, and means operable from said cockpit to adjust the vertical position of said float in said tank.

5. For use in a hydroplane equipped for water bombing, said hydroplane including a body, a pair of pontoons supporting said body, each of said pontoons including a built-in tank having a discharge opening and a top formed with a vent therein, a door hingedly mounted at one side of said opening, bulkheads in said tank, a shaft journalled in said bulkheads, mechanical linkage between said shaft and door whereby rotation of said shaft causes swinging movement of said door, a latch normally holding said door in closed position, means for releasing said latch to permit said door to swing open under gravity action, and means for rotating said shaft to move said door to closed position, a pressure and overflow relief device comprising: a closure pivotally mounted on said top at one side of said vent; and operating connections between said closure and said shaft, said connections comprising a lower rod drivably carried by said shaft, an upper rod having its upper end pivotally connected to said closure; and spring means yieldably maintaining said rods in aligned assembled relation.

6. In a hydroplane equipped for water bombing, said hydroplane including a body having a cockpit, and a pair of pontoons supporting said body, each of said pontoons including a built-in tank having a discharge opening, a door hingedly mounted at one side of said discharge opening and means for moving said door between open position and closed position, said tank having a top formed with an aperture therein, a door position indicator device comprising: a transparent indicator housing visible from said cockpit and mounted on the upper surface of said tank in superimposed relation to said aperture; an indicator pivotally mounted on the inner surface of said tank adjacent said aperture and mounted for rotational displacement to a position wherein said indicator projects through said aperture into said housing; a push rod pivotally connected at its upper end to said indicator; and a support on said tank adjacent said opening slidably receiving the lower end of said rod with a portion thereof projecting below said support and engaged by said door in the final stages of closing movement to raise said indicator to visible position.

7. In a hydroplane equipped for water bombing, a body having a cockpit, a pair of pontoons supporting said body, each of said pontoons including a built-in tank having a forward bulkhead and a second bulkhead spaced therefrom, a shaft journalled in said bulkheads, said tank having a downward opening, a door hingedly mounted on said tank at one side of said opening, and mechanical linkage between said door and shaft; the improvement consisting of: mechanism for permitting door opening rotation of said shaft and causing door closing rotation thereof, said mechanism comprising a latch arm pivotally mounted on the front face of said forward bulk head, a pin carried by said latch arm, a solenoid on said bulkhead and having an armature connected to said latch arm, a bell crank drivably mounted on said shaft and having a pair of arms one of which has a recess at its free end receiving said pin in latched condition of the shaft, the other arm of the bell crank having a flange, a hydraulic cylinder mounted on said bulkhead and having a piston engaging said flange during door closing rotation of said shaft; a control switch for said solenoid in said cockpit, and a control for said hydraulic cylinder in said cockpit.

8. In a hydroplane equipped for water bombing, a body having a cockpit, a pair of pontoons supporting said body, each of said pontoons including a built-in tank having a forward bulkhead and a second bulkhead spaced therefrom, a shaft journalled in said bulkheads, said tank having a downward opening, a door hingedly mounted on said tank at one side of said opening, and mechanical linkage between said door and shaft; the improvement consisting of: mechanism for permitting door opening rotation of said shaft and causing door closing rotation thereof, said mechanism comprising a latch arm pivotably mounted on the front face of said forward bulkhead, a pin carried by said latch arm, a solenoid on said bulkhead and having an armature connected to said latch arm, a bell crank drivably mounted on said shaft and having a pair of arms one of which has a recess at its free end receiving said pin in latched condition of the shaft, the other arm of the bell crank having a flange, a hydraulic cylinder mounted on said bulkhead and having a piston engaging said flange during door closing rotation of said shaft; a control switch for said solenoid in said cockpit, a control for said hydraulic cylinder in said cockpit, a projection on said latch arm on the side opposite to said pin, an auxiliary arm pivotally mounted on said bulkhead in close proximity to said latch arm and underlying said projection; a cable having one end secured to said auxiliary arm and extending into said cockpit; and a handle on said cable for exerting tension thereon to raise said auxiliary arm to lift said latch arm.

9. In a hydroplane equipped for water bombing, said hydroplane including a body having a cockpit, and a pair of pontoons supporting said body, each of said pontoons including a built-in tank having a downward opening, a door hingedly mounted at one side of the opening and normally biased to open position by gravity action, bulkheads in said tank, a shaft journalled in said bulkheads, mechanical linkage between said shaft and door whereby rotation of said shaft causes swinging movement of said door, and a latch holding said door in closed position, the improvement consisting of: power means operable from said cockpit to release said latch and permit said door to swing open; power means to rotate said shaft to move said door to closed position and including a control in said cockpit; a manually operable mechanical device for releasing said latch and including an operating member in said cockpit; a manually operable mechanical device for imparting door closing rotation to said shaft, said last mentioned device including an operating member in said cockpit; and an indicator visible from said cockpit to indicate the position of said door.

References Cited

UNITED STATES PATENTS

| | | | |
|---|---|---|---|
| 1,396,894 | 11/1921 | Stevens | 244—136 |
| 1,911,431 | 5/1933 | Cawley | 244—136 |
| 2,798,751 | 7/1957 | Walden | 49—394 |
| 2,947,534 | 8/1960 | Leimer et al. | 49—139 |

MILTON BUCHLER, *Primary Examiner.*

J. PITTENGER, *Assistant Examiner.*

U.S. Cl. X.R.

116—132; 49—139